United States Patent
Loucks et al.

(10) Patent No.: US 7,635,967 B2
(45) Date of Patent: Dec. 22, 2009

(54) GENERATOR SYSTEMS AND METHODS USING TIMING REFERENCE SIGNAL TO CONTROL GENERATOR SYNCHRONIZATION

(75) Inventors: David Glenn Loucks, Coraopolis, PA (US); Rune Lennart Jonsson, Raleigh, NC (US)

(73) Assignee: Eaton Corporation, Cleveland, OH (US)

( * ) Notice: Subject to any disclaimer, the term of this patent is extended or adjusted under 35 U.S.C. 154(b) by 318 days.

(21) Appl. No.: 11/780,524

(22) Filed: Jul. 20, 2007

(65) Prior Publication Data

US 2009/0021082 A1  Jan. 22, 2009

(51) Int. Cl.
*H02J 1/00* (2006.01)
*H02J 3/08* (2006.01)

(52) U.S. Cl. .................. 322/18; 290/40 C; 307/87
(58) Field of Classification Search .............. 290/40 A, 290/40 C; 322/10, 18, 20; 307/87, 73
See application file for complete search history.

(56) References Cited

U.S. PATENT DOCUMENTS

| | | | |
|---|---|---|---|
| 3,794,846 A * | 2/1974 | Schlicher et al. | 307/87 |
| 4,139,807 A | 2/1979 | Hucker | |
| 5,761,073 A * | 6/1998 | Dickson | 702/75 |
| 6,134,124 A | 10/2000 | Jungreis et al. | |
| 6,169,390 B1 | 1/2001 | Jungreis | |
| 7,230,344 B2 * | 6/2007 | Pollack et al. | 290/40 C |
| 7,566,990 B2 * | 7/2009 | Loucks et al. | 307/64 |
| 2001/0022472 A1 | 9/2001 | Codina et al. | |
| 2005/0200205 A1 | 9/2005 | Winn et al. | |
| 2009/0021079 A1 * | 1/2009 | Johnson et al. | 307/68 |

OTHER PUBLICATIONS

Invitation to Pay Additional Fees And, Where Applicable, Protest Fee (9 pages) corresponding to International Application No. PCT/IB2008/001893; Mailing Date: Mar. 6, 2009.
MGE—UPS Systems, "UPS Topologies and Standards: Abstract", 3 pages, (Nov. 1, 1999) XP007907031.
International Search Report and Written Opinion (20 pages) corresponding to International Application No. PCT/IB2008/001893; Mailing Date: May 12, 2009.

* cited by examiner

*Primary Examiner*—Nicholas Ponomarenko
(74) *Attorney, Agent, or Firm*—Myers Bigel Sibley & Sajovec, P.A.

(57) ABSTRACT

A power generation system includes a generator configured to be connected to a bus. The system also includes a timing reference signal generator circuit configured to detect a timing variation of a voltage on the bus and to generate a timing reference signal from a timing reference other than the voltage on the bus in response to detection of the variation. The system further includes a generator control circuit configured to synchronize operation of the generator to the timing reference signal.

15 Claims, 8 Drawing Sheets

GENERATOR SYSTEMS AND METHODS USING TIMING REFERENCE SIGNAL TO CONTROL GENERATOR SYNCHRONIZATION

BACKGROUND OF THE INVENTION

The invention relates to power systems and methods and, more particularly, to power systems and methods employing generators.

Power distribution systems for facilities may serve critical, life safety and other types of loads that require high availability. A typical power distribution system for such a facility, therefore, may include an auxiliary generator, such as a diesel-powered motor-generator set, which may supply power to these loads when a primary power source, such as a utility source, fails. Such a generator may also be used for distributed generation (DG), wherein locally generated power is in lieu of power drawn from the utility and/or excess locally generated power is transferred to the grid.

The generators used in such applications typically are synchronous generators, and a variety of techniques are used to control synchronous generators. Isochronous speed control techniques are typically used for generators operating alone or for a generator that is serving as a "master" among a group of paralleled generators. In a typical isochronous control scheme, the energy being admitted to the prime mover of a generator is regulated to maintain generator speed in response to changes in load that would tend to cause changes in speed. An increase in load would tend to cause the generator to decelerate, but the isochronous controller acts to provide additional torque from the prime mover to maintain the generator speed. Similarly, the isochronous controller reduces torque in response to a decrease in load.

Droop speed control techniques are commonly used when a generator is acting subordinate to another generator or when the generator is providing power to a utility bus that dominantly controls voltage phase and frequency at the generator output. In a typical droop speed control technique, the generator controller uses a speed control loop that, because of the inability to change the actual speed of the generator, actually controls power delivered to the bus. To increase the power output of the generator, a speed set point of the speed control loop is increased, but the actual speed does not change because the speed is substantially fixed by the frequency of the grid to which the generator is connected. The actual speed of the generator, thus, "droops" with respect the speed set point, and the difference between the set point and the actual speed is correlated to the amount of power being delivered by the generator.

FIG. 1 illustrates a conventional DG system. A utility recloser 2 and a service entrance breaker 3 convey power from a utility source 1 to a generator bus 4. A load may be connected to the generator bus 4 by a load breaker 8. A generator 5 may be connected and disconnected to and from the generator bus 4 by a generator breaker 6. A system controller 7 monitors voltage and current upstream of the service entrance breaker 3 and voltage and current on the generator bus 4 and responsively controls the service entrance breaker 3, the generator breaker 6 and the generator 5.

During parallel generation with the utility, the recloser 2 and the service entrance and generator breakers 3, 6 are closed, such that the generator 5 operates in parallel with the utility source 1. Typically, the service entrance breaker 3 is allowed to close only after determining that the voltage, frequency and phase on the utility side of the service entrance breaker 3 and voltage, frequency and phase on the generator bus 4 agree within a predetermined tolerance, e.g., within 5%. The system controller 7 measures these quantities and may also compute additional derived quantities, such as real and reactive power flows and power factor, based on these measured quantities. This information may be used for protective and control functions, including overcurrent, undervoltage, overvoltage, underfrequency and overfrequency protection and load sharing between generators if multiple generators are operated in parallel. The system controller 7 may trip the service entrance and generator breakers 3, 6 as part of these functions.

When co-generating, the phase and frequency of the voltage on the generator bus 4 are typically controlled by the utility source 1. Accordingly, the system controller 7 operates in a mode, e.g., a droop control mode, where the controller 7 does not control frequency and phase of the generator 5. However, when the utility source 1 is lost, the phase and frequency of the generator 5 is no longer constrained by the utility source 1. Upon loss of connection to the utility source 1, the system controller 7 can change over to a mode, e.g., an isochronous control mode, that allows the generator 5 to continue operating independently.

If the loss of connection to the utility source 1 is only momentary and power is restored before the system controller 7 can detect the loss, the generator bus 4 will be live when the utility source 1 is re-connected. If the frequency and/or phase of the generator bus 4 has drifted with respect to the utility during the period of disconnection, the re-connection may be out of phase, which can cause large transient currents, voltages and torques that may cause equipment damage.

Upon loss of utility power, it is generally desirable that the generator of a DG system disconnect from the grid as soon as possible. As discussed above, the loss of utility power may be of short duration, e.g., on the order of a few cycles, as is common with operation of reclosers, and the DG system may have difficulty detecting the loss of the utility, factors that together may cause the DG system to fail to disconnect the generator before utility power is restored. If the DG generation system has failed to disconnect the generator from the utility and the locally generated voltage has shifted in phase with respect to the grid voltage when the utility power returns, return of utility power can cause serious problems, including overcurrent trips by the generator or at the utility service entrance, damage to the generator shaft couplings, generator rotor damage due to overtorque and blown utility or customer fusing. These problems may arise because generator phase lock is typically lost once the utility is separated from the generator and reclosers typically reapply power to the downstream grid without concern for phase relationships between the utility and the downstream bus.

A conventional technique for preventing these problems is described in IEEE 1547 Standard for Interconnecting Distributed Resources with Electric Power Systems (2003). This standard describes several techniques for detecting a loss of utility, including the installation of directional overcurrent and direction power relaying, frequency relaying, rate-of-change of frequency detection and voltage monitoring at the DG site service entrance. Generally, however, the more closely the current or power flowing into or out of the DG site approaches zero or the greater the percentage of total load on the DG feeder is supported by the DG generator, the more difficult it may be to detect loss of utility power using such techniques.

A conventional technique for controlling a DG system in response to recloser or substation breaker operation involves providing a communications link between the next upstream utility recloser or substation breaker and the main service entrance breaker of the DG system. When the monitored upstream recloser or breaker opens, a signal is transmitted to the DG system, which responsively opens the service entrance breaker. Such a "transfer trip" system may be relatively expensive, typically requires installation at both utility and customer locations and may require ongoing expenses for providing communications. In addition, if utility power is lost upstream of the monitored recloser or breaker, the transfer trip typically will not occur, and the service entrance breaker will not trip, potentially leading to the out-of-phase reconnection problems described above.

SUMMARY OF THE INVENTION

In some embodiments of the present invention, a power generation system includes a generator configured to be connected to a bus. The system also includes a timing reference signal generator circuit configured to detect a timing variation of a voltage on the bus and to responsively generate a timing reference signal from a timing reference other than the voltage on the bus following the variation. The system further includes a generator control circuit configured to synchronize operation of the generator to the timing reference signal. The timing reference signal generator circuit may be configured to generate the timing reference signal based on prior timing of the voltage on the bus. For example, the timing reference signal generator circuit may be configured to generate a timing signal in synchronism with the voltage on the bus and to generate the timing reference signal based on prior behavior of the timing signal. For example, the timing reference signal generator circuit may include a phase locked loop configured to generate the timing signal.

In further embodiments, the timing reference signal generator circuit may be configured to generate the timing reference signal in synchronism with the voltage on the bus prior to detection of the variation. The generator control circuit may be configured to support a first mode wherein the generator control circuit controls power delivered to the bus in parallel while another power source (e.g., a utility source) controls a voltage waveform timing of the bus and a second mode wherein the generator control circuit synchronizes operation of the generator to the timing reference signal. The generator control circuit may be further configured to transition from the first mode to the second mode responsive to the timing reference signal. The generator control circuit may be configured to transition from the first mode to the second mode responsive to detection of a variation in the timing reference signal by the timing reference signal generator circuit.

In some embodiments of the present invention, the timing reference signal generator circuit includes an uninterruptible power supply (UPS) coupled to the bus. The UPS may have an output configured to be coupled to a load. The timing reference signal may include a voltage at the output of the UPS. The UPS may include the timing reference signal generator circuit and an output inverter configured to generate a voltage at an output of the UPS responsive to the timing reference signal.

According to additional embodiments of the present invention, a power generation system includes a generator configured to be connected to a bus and a circuit interruption device configured to connect and disconnect the bus to and from a power source. The system further includes a control circuit configured to generate a timing signal in synchronism with a voltage on the bus and to control the circuit interruption device responsive to the timing signal. For example, the control circuit may be configured to cause the circuit interruption device to disconnect the bus from the power source responsive to a variation in the timing signal.

Further embodiments provide methods of operating a power generation system including a generator configured to be connected to a bus. A timing variation of the voltage on the bus is detected and, responsive to detecting the variation, a timing reference signal is generated from a timing reference other than the voltage on the bus following the variation. Operation of the generator is then synchronized to the timing reference signal. In further method embodiments, a timing signal is generated in synchronism with a voltage on the bus and the circuit interruption device is controlled responsive to the timing signal.

DETAILED DESCRIPTION OF EXEMPLARY EMBODIMENTS

Figure 1:
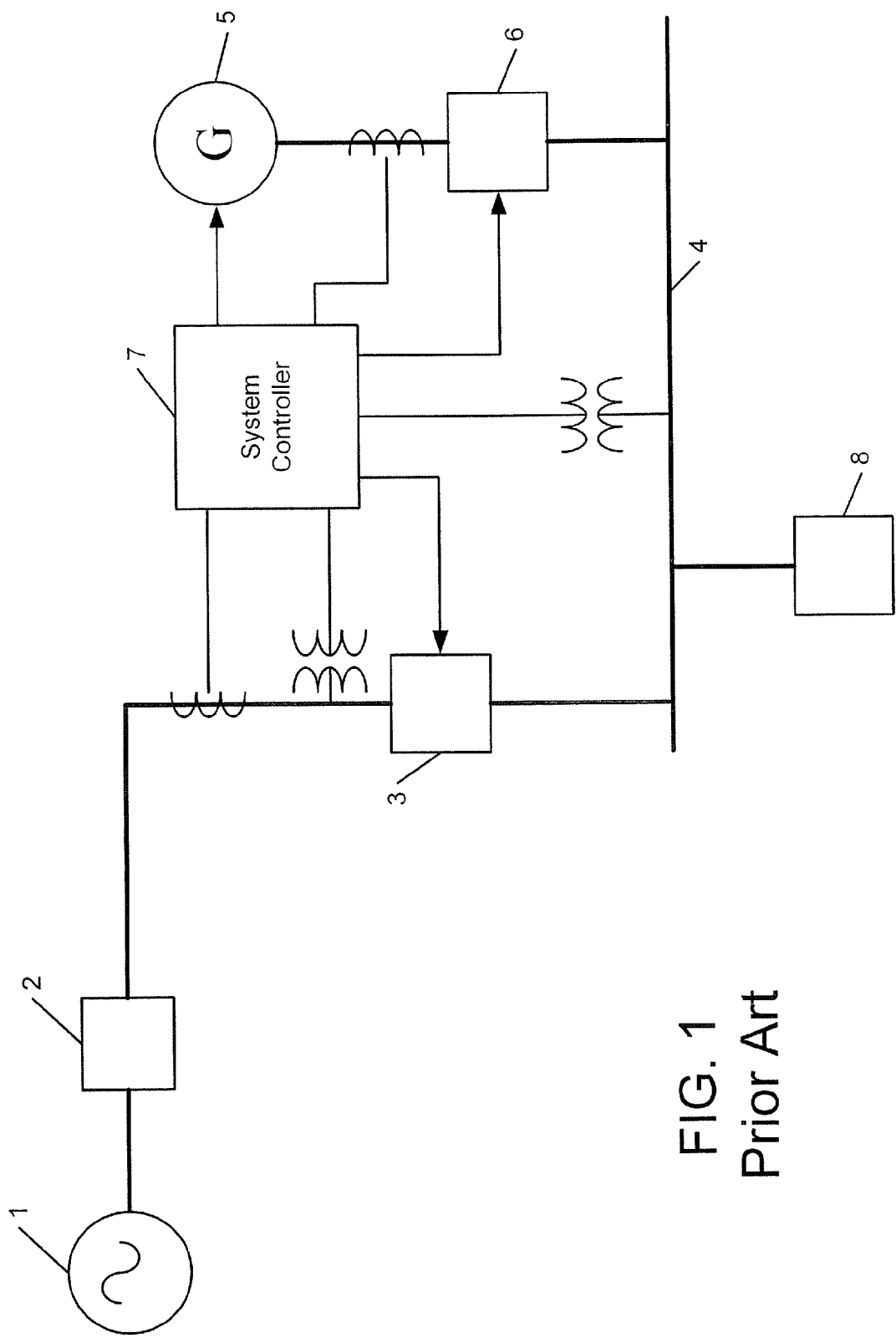
FIG. 1 is a schematic diagram illustrating a conventional distributed generator (DG) system.

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

As will be appreciated by one of skill in the art, the invention may be embodied as system and methods. Embodiments of the invention may include hardware and/or software. Embodiments of the invention include circuitry configured to provide functions described herein. It will be appreciated that such circuitry may include analog circuits, digital circuits, and combinations of analog and digital circuits.

Embodiments of the invention are described below with reference to block diagrams and/or operational illustrations of systems and methods according to various embodiments of the invention. It will be understood that each block of the block diagrams and/or operational illustrations, and combinations of blocks in the block diagrams and/or operational illustrations, can be implemented by analog and/or digital hardware, and/or computer program instructions. These computer program instructions may be provided to a processor of a general purpose computer, special purpose computer, ASIC, and/or other programmable data processing apparatus, such that the instructions, which execute via the processor of the computer and/or other programmable data processing apparatus, create means for implementing the functions/acts specified in the block diagrams and/or operational illustrations. In some implementations, the functions/acts noted in the figures may occur out of the order noted in the block diagrams and/or operational illustrations. For example, two operations shown as occurring in succession may, in fact, be executed substantially concurrently or the operations may sometimes be executed in the reverse order, depending upon the functionality/acts involved.

Some embodiments of the invention arise from a realization that, in DG systems, drift of generator bus voltage frequency/phase may be indicative of loss of connection with the utility. In some embodiments of the present invention, detection of such drift may be accomplished using a local timing reference signal generator, such as one incorporated in a UPS to support its converter operations, to detect disconnection of a DG system from a parallel power source, such as a utility grid. Such a timing reference signal generator may also be configured to transition to synthesizing a timing reference signal after detecting loss of connection to keep the frequency/phase of a disconnected DG system generator closer to that of the power source from which it has disconnected. This may be used to reduce frequency/phase discrepancies when the generator and power source are reconnected.

Figure 2:
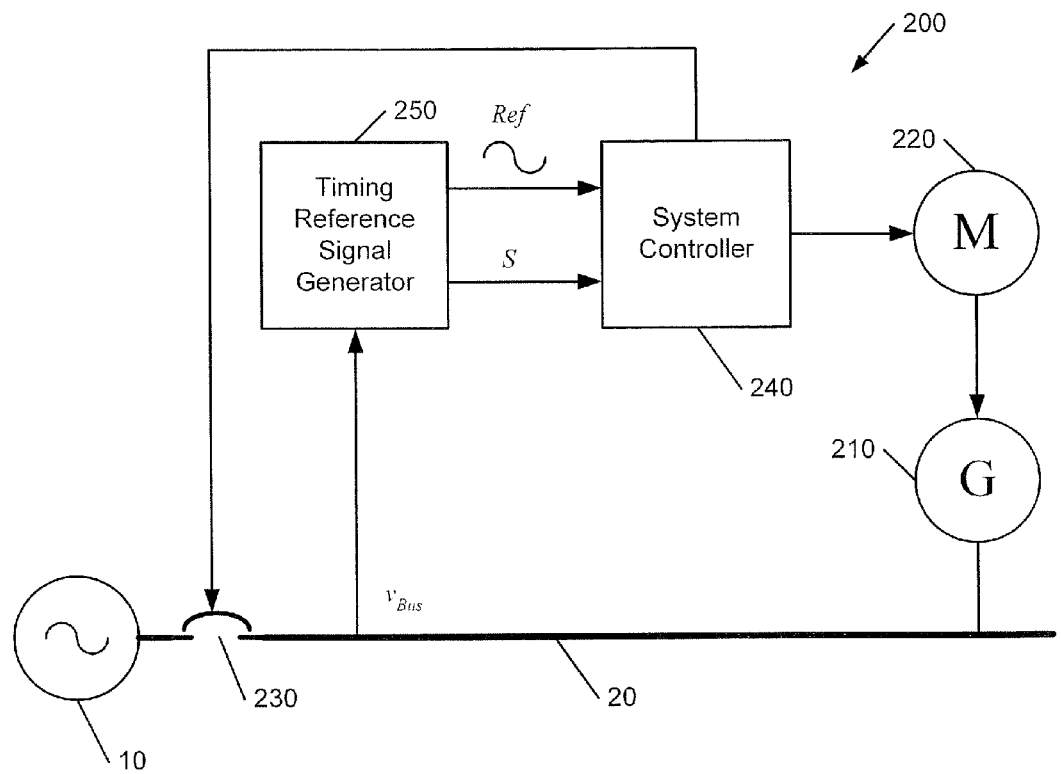
FIG. 2 is a schematic diagram illustrating a power generation system according to some embodiments of the present invention.

FIG. 2 illustrates a power generation system 200 according to some embodiments of the present invention. The system 200 includes a generator 210 that is configured to be coupled to a bus 20 and driven by a prime mover 220, for example, a diesel or natural gas powered engine. The system 200 also includes a circuit interruption device 230, for example, a circuit breaker, that is configured to connect and disconnect the bus 20 to and from a power source 10, such as a utility grid.

The system 200 further includes a system control circuit 240 that is configured to control the motor/generator combination 210, 220 responsive to a timing reference signal Ref generated by a timing reference signal generator circuit 250. The timing reference signal generator circuit 250 is configured to generate the timing reference signal Ref based on the bus voltage $v_{BUS}$ on the bus 20. In particular, the timing reference signal generator circuit 250 may be operative to monitor timing of the bus voltage $v_{BUS}$ and, responsive to detecting a variation meeting a predetermined criterion, to generate the timing reference signal Ref using a timing reference other than the current bus voltage $v_{BUS}$.

Figure 3:
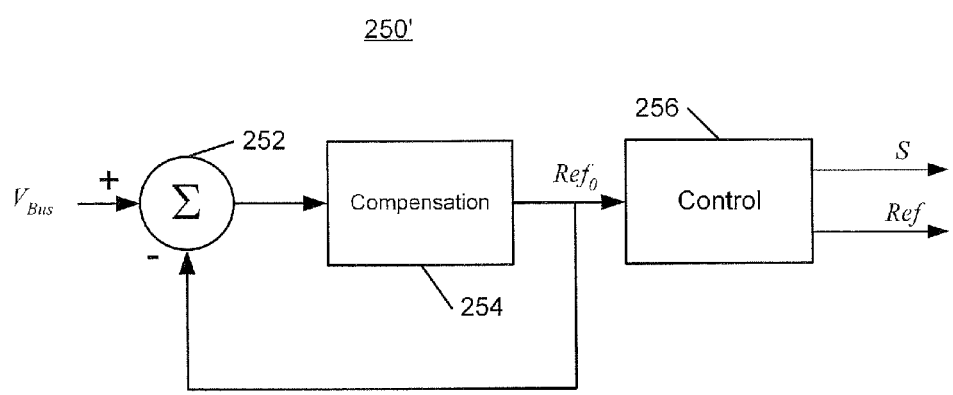
FIG. 3 is a schematic diagram illustrating a timing reference signal generator circuit according to further embodiments of the present invention.

For example, referring to FIG. 3, a timing reference signal generator circuit 250' may include a phase-locked loop (PLL) circuit that includes a summing circuit 252 that compares a signal $V_{BUS}$ representative of the bus voltage $v_{BUS}$ to a PLL output signal $Ref_0$ and a compensation circuit 254 that responsively corrects the PLL output signal $Ref_0$ to synchronize its timing with the signal $V_{BUS}$. The timing reference signal generator circuit 250' may further include a control circuit 256 that generates a timing reference signal Ref based on the timing signal $Ref_0$ produced by the PLL.

In a DG system, for example, when a timing (e.g., frequency/phase) of the PLL output signal $Ref_0$ meets a predetermined criterion indicative that the frequency/phase of the bus voltage $v_{BUS}$ is relatively stable and not drifting beyond the degree expected for the utility to which the system is connected, the control circuit 256 may pass through the PLL output signal $Ref_0$ as the timing reference signal Ref. As discussed in detail below, this may cause the generator to operate in substantially a droop mode, as there should be little or no difference between the generator frequency/phase and the timing reference signal. However, responsive to detection of a variation in the PLL output signal $Ref_0$ that fails the predetermined criterion, for example, a variation in a cycle duration, phase/frequency error or other variation indicative of a drift in the bus voltage $v_{BUS}$ and, accordingly, indicative of disconnection from the utility, the control circuit 256 generates the timing reference signal Ref, which may be used as a timing reference for operation of the generator 210, from a timing reference other than the drifting bus voltage $v_{BUS}$. For example, as described below, the timing reference signal Ref may be synthesized from stored information representative of behavior of the bus voltage $v_{BUS}$ prior to the deviation.

As described in detail below, a timing reference signal generator circuit 250, 250' as shown in FIGS. 2 and 3 may be part of an uninterruptible power supply (UPS). For example, the timing reference signal generator circuit 250' may be a circuit designed to produce a timing reference signal for operation of an output inverter of the UPS. In other embodiments, the timing reference signal Ref may be the actual AC output voltage of the UPS, which may be synchronized to a timing reference signal produced as described above.

It will be appreciated that detection of variation of the PLL output signal $Ref_0$ may be achieved in any of a number of different ways. For example, the control circuit 256 may record several cycles of the PLL output signal $Ref_0$ and analyze this recorded data to detect frequency and/or phase drift by reference to another timing reference, such as a timing reference generated from an electronic oscillator. In other embodiments, variation may be detected by monitoring the error signal generated by the summing circuit 252 of the PLL.

Generation of the timing reference signal Ref based on a timing reference other than the bus voltage $v_{BUS}$ may also occur in any of a number of different ways. For example, the control circuit 256 may record several cycles of the PLL output signal $Ref_0$. Upon detection of a variation meeting a predetermined criterion, the control circuit 256 may use this stored information about behavior of the PLL output signal $Ref_0$ (and, accordingly, of the bus voltage $v_{BUS}$) prior to the detected variation to synthesize the reference signal, e.g., by cyclically repeating a recorded cycle of the PLL output signal $Ref_0$ and/or by generating the reference signal Ref using an oscillator or other signal generator having its set point determined based on such information.

Referring again to FIG. 2, the system control circuit 240 may be further configured to control operation of the circuit interruption device 230. For example, responsive to a signal S that signals a variation in the phase/frequency of the bus voltage $v_{BUS}$ indicative of an amount of drift beyond a predetermined limit, the system control circuit 240 may cause the circuit interruption device 230 to open, thus preventing an out-of-phase reconnection to the power source 10. Referring to FIG. 3, the control circuit 256 may generate the detection signal S responsive to the PLL output signal $Ref_0$.

Figure 4:
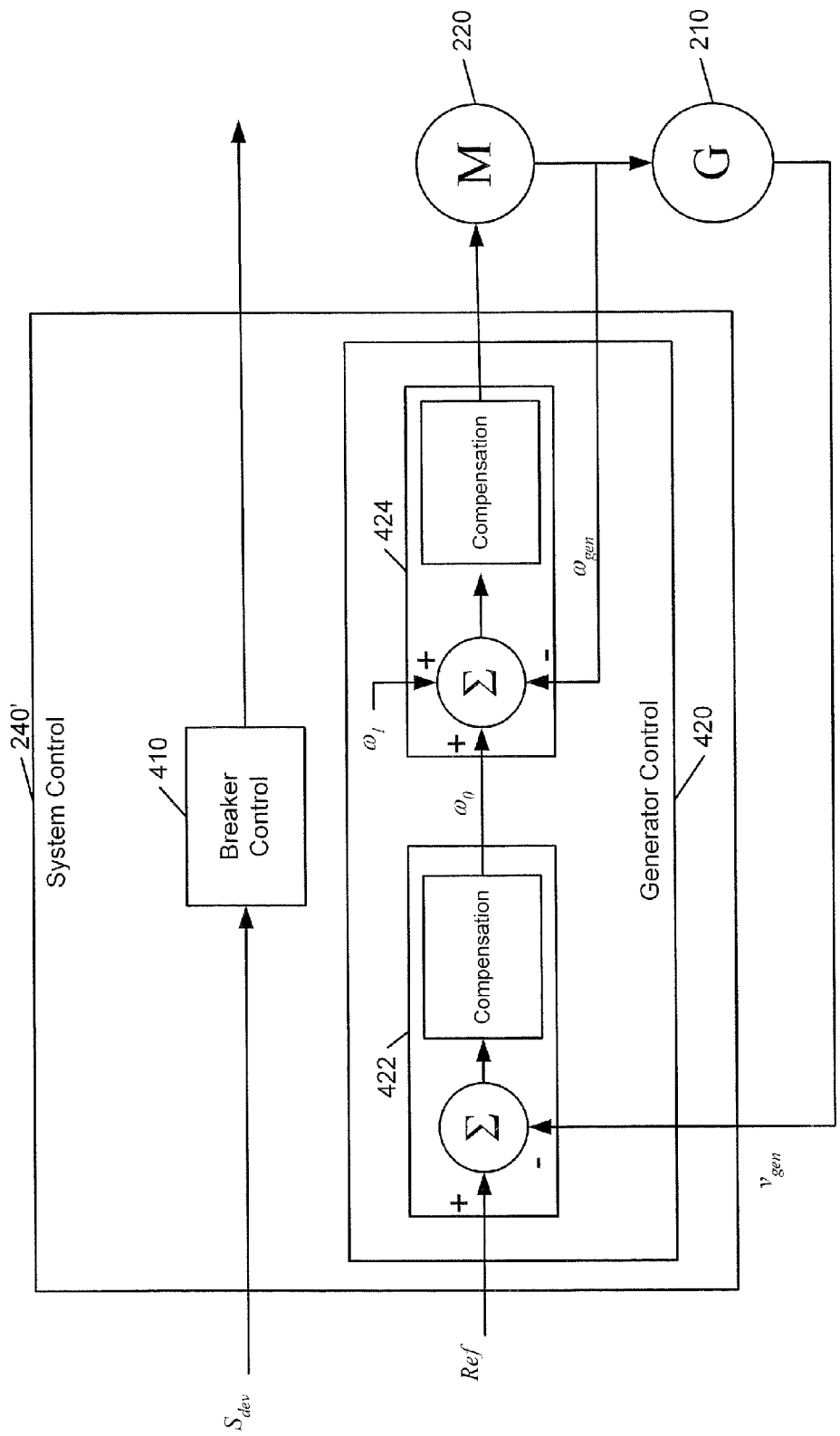
FIG. 4 is a schematic diagram illustrating a power generation system control circuit according to further embodiments of the present invention.

FIG. 4 illustrates a generation system control circuit 240' according to further embodiments of the present invention. The system control circuit 240' includes a generator control circuit 420 having an inner speed loop controller 424 that receives a first speed command $\omega_0$ from an outer phase/frequency loop controller 422 and a second speed command $\omega_1$ from another source. When the generator bus is connected to the utility, the generator frequency/phase is controlled by the utility and the reference signal Ref is synchronized to the bus voltage $v_{BUS}$, such that the speed command $\omega_0$ from the outer phase/frequency loop controller 422 should be negligible and, thus, substantially cease to control the speed loop controller 424. In such a state, the speed control loop may be viewed as operating in a droop mode wherein the second speed command $\omega_1$ controls how much power is delivered to the bus by the generator. When the generator bus is disconnected from the utility and the timing reference signal Ref is no longer synchronized to the generator bus voltage, however, the phase/frequency loop controller 422 takes over control, as it generates the first speed command $\omega_0$ to attempt to minimize the error between the generator bus voltage phase/frequency and the timing reference signal Ref. As shown, the system control circuit 240' may further include a breaker control circuit 410 that operates responsive to a status signal S indicative of whether the generator bus voltage has drifted sufficiently to necessitate generator bus disconnection along lines discussed above with reference to FIG. 2.

Figure 5:
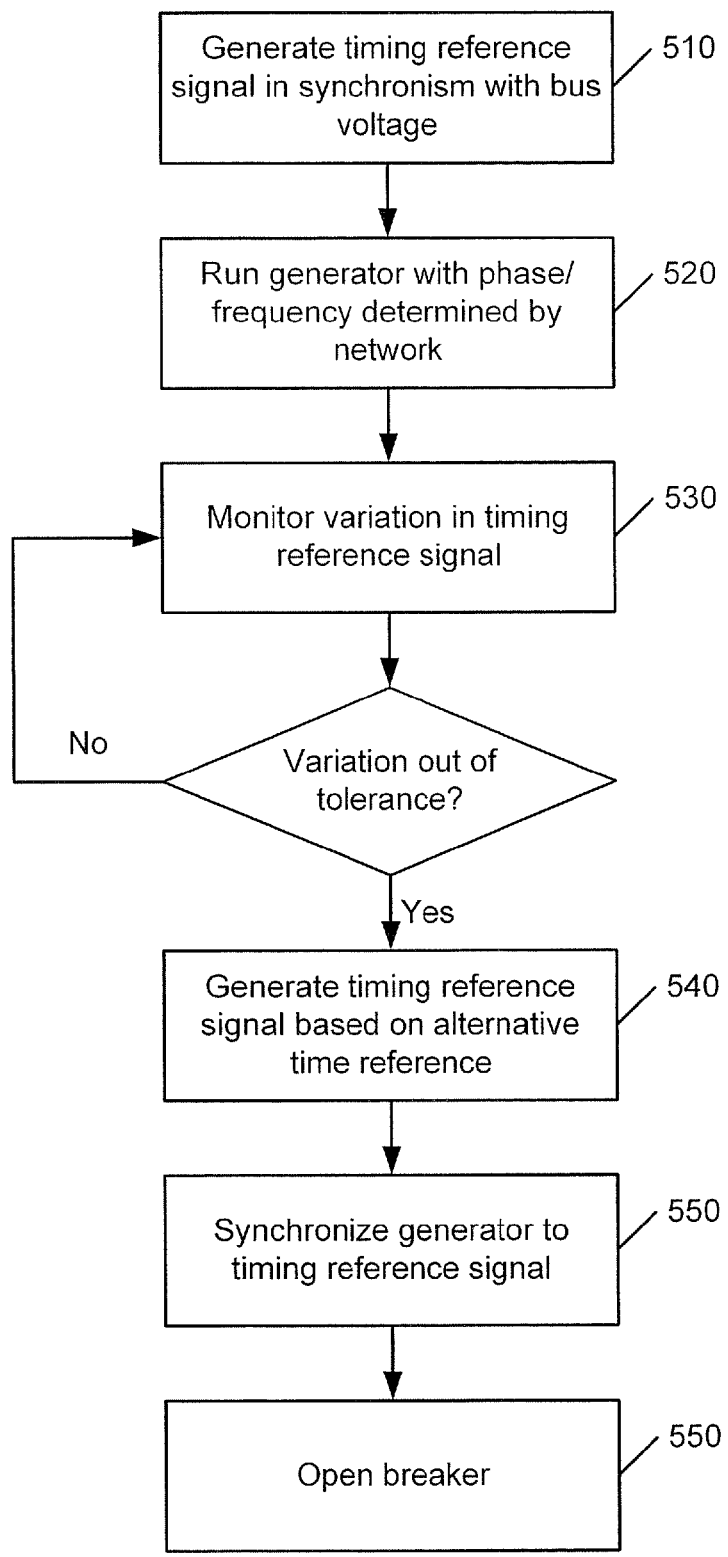
FIG. 5 is a flowchart illustrating exemplary operations of a power generation system according to some embodiments of the present invention.

FIG. 5 is a flowchart illustrating exemplary operation of a generation system configured along lines discussed above. A timing reference signal is generated in synchronism with a voltage on the bus the generator is driving (block 510). Concurrently, a generator is operated in a first mode without use of a phase/frequency reference (block 520). Variation of the timing reference signal is monitored and, in response to detecting a variation that meets a predetermined criterion (e.g., exceeds a predetermined tolerance), the timing reference signal is generated using an alternative time reference (block 530, 540). Operation of the generator is then synchronized to the timing reference signal, e.g., by transitioning to a phase/frequency controlled mode of operation as discussed above with reference to FIG. 4 (block 550). Responsive to detection of a variation in the timing reference signal, a breaker coupling the system to a utility or other source may also be opened (block 560).

It will be appreciated that the embodiments of FIGS. 2-5 may be implemented in a number of different ways. For example, circuitry implementing the system control circuit 240 and timing reference signal generator circuit 250 of FIG. 2 may be integrated into a common assembly (e.g., with the generator 210 and prime mover 220), or may be distributed among multiple assemblies. Generally, the control circuitry described in FIGS. 2-4 may be implemented in analog and/or digital circuits. For example, the system control circuit 240' of FIG. 4 may be implemented using, for example, a computing device, such as a microprocessor or microcontroller, that executes software or firmware to perform some or all of the functions described and/or analog circuitry that performs similar control functions in an analog domain.

Figure 6:
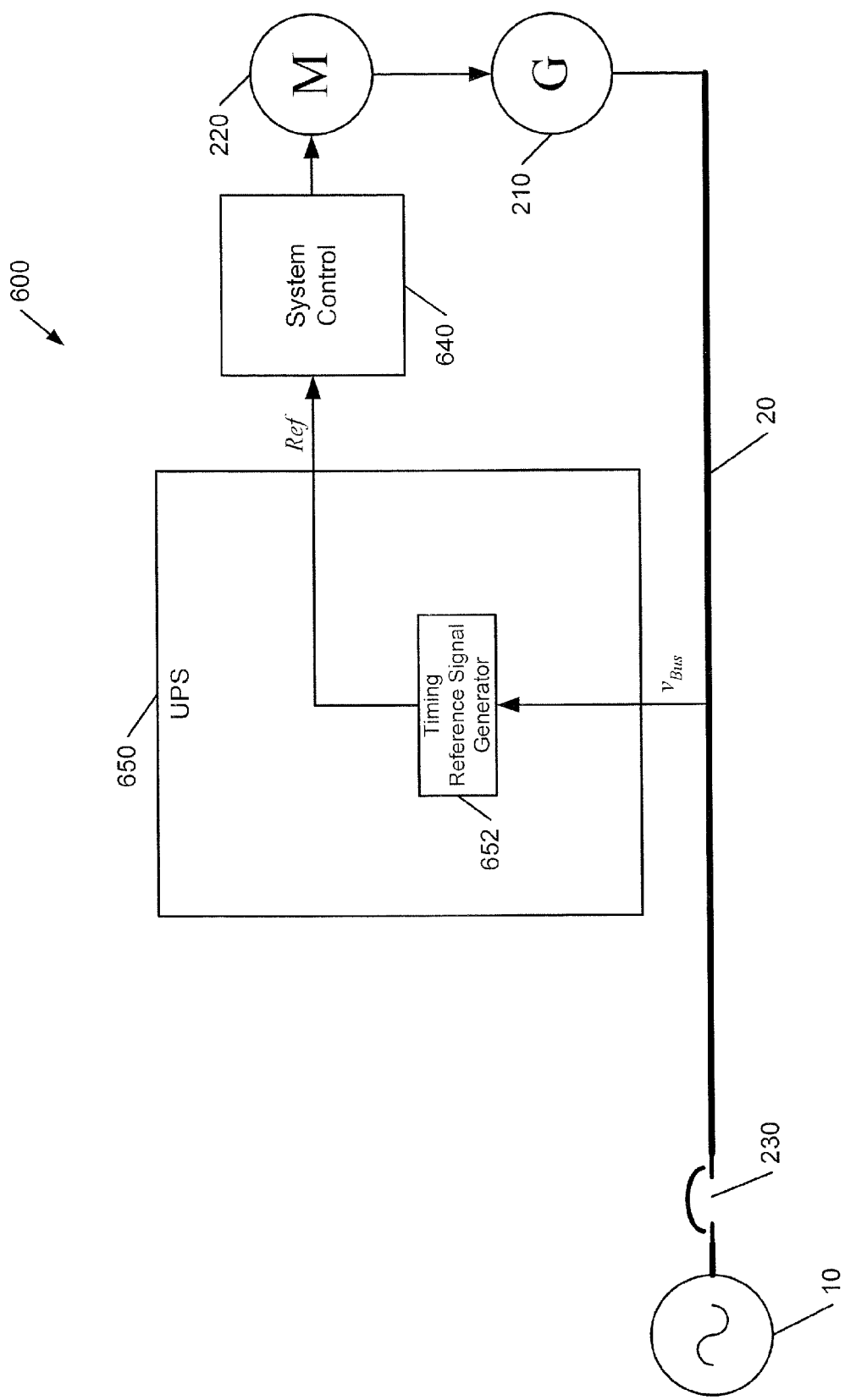
FIGS. 6-9 are schematic diagrams illustrating power generation systems utilizing uninterruptible power supplies for generator timing reference information according to further embodiments of the present invention.

In some embodiments of the present invention, a UPS may generate a timing reference signal for operation of a generator. Referring to FIG. 6, a power generation system 600 according to some embodiments of the present invention includes a generator 210 configured to be connected to a bus 20. A prime mover 220 is configured to drive the generator 210. Responsive to a timing reference signal Ref, a system control circuit 640 controls the generator and prime mover 210, 220. In the illustrated embodiments, a timing signal generator circuit 652 of a UPS 650 generates the timing reference signal Ref.

Figure 7:
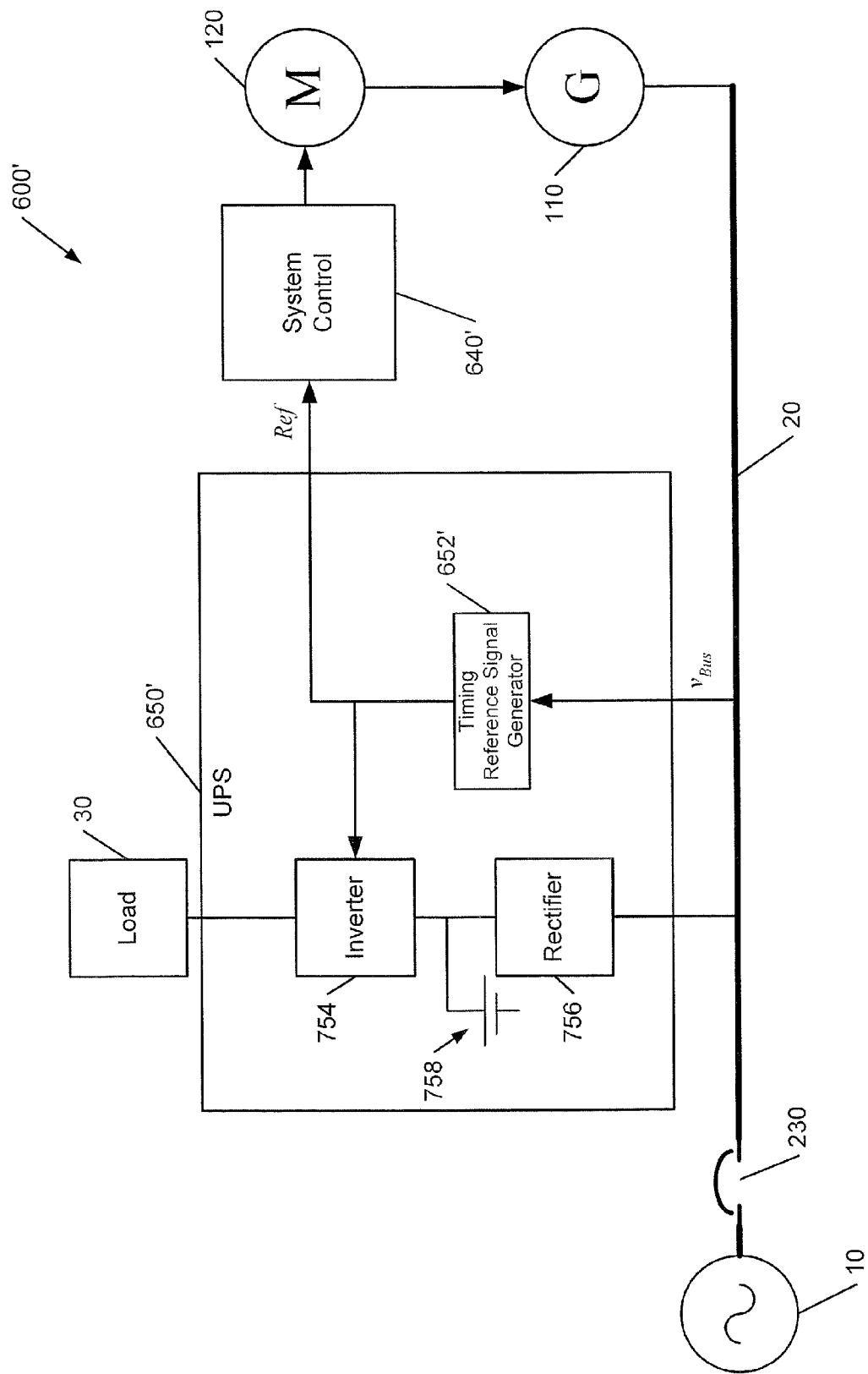

FIG. 7 illustrates a similar power generation system 600' according to further embodiments of the present invention. Like elements of the system 600' and the system 600 of FIG. 6 are indicated by like reference numerals, and will not be further described in light of the foregoing description thereof. The system 600' includes an online UPS 650' that includes a rectifier 756 configured to be coupled to the bus 20 and coupled by a DC link to an inverter 754. A battery 758 provides an auxiliary power source for the inverter 754. The inverter 754 is configured to be coupled to a load 30 and operates responsive to a timing reference signal Ref generated by a timing signal generator circuit 652'. For example, the timing reference signal Ref may be a sine wave reference signal that serves as a reference input to a voltage control loop that controls an output voltage produced by the inverter 754. The timing signal Ref is also provided to a system control circuit 640', which operates as described above with reference to FIG. 6. A battery 758 provides an auxiliary power source for the inverter 754.

Figure 8:
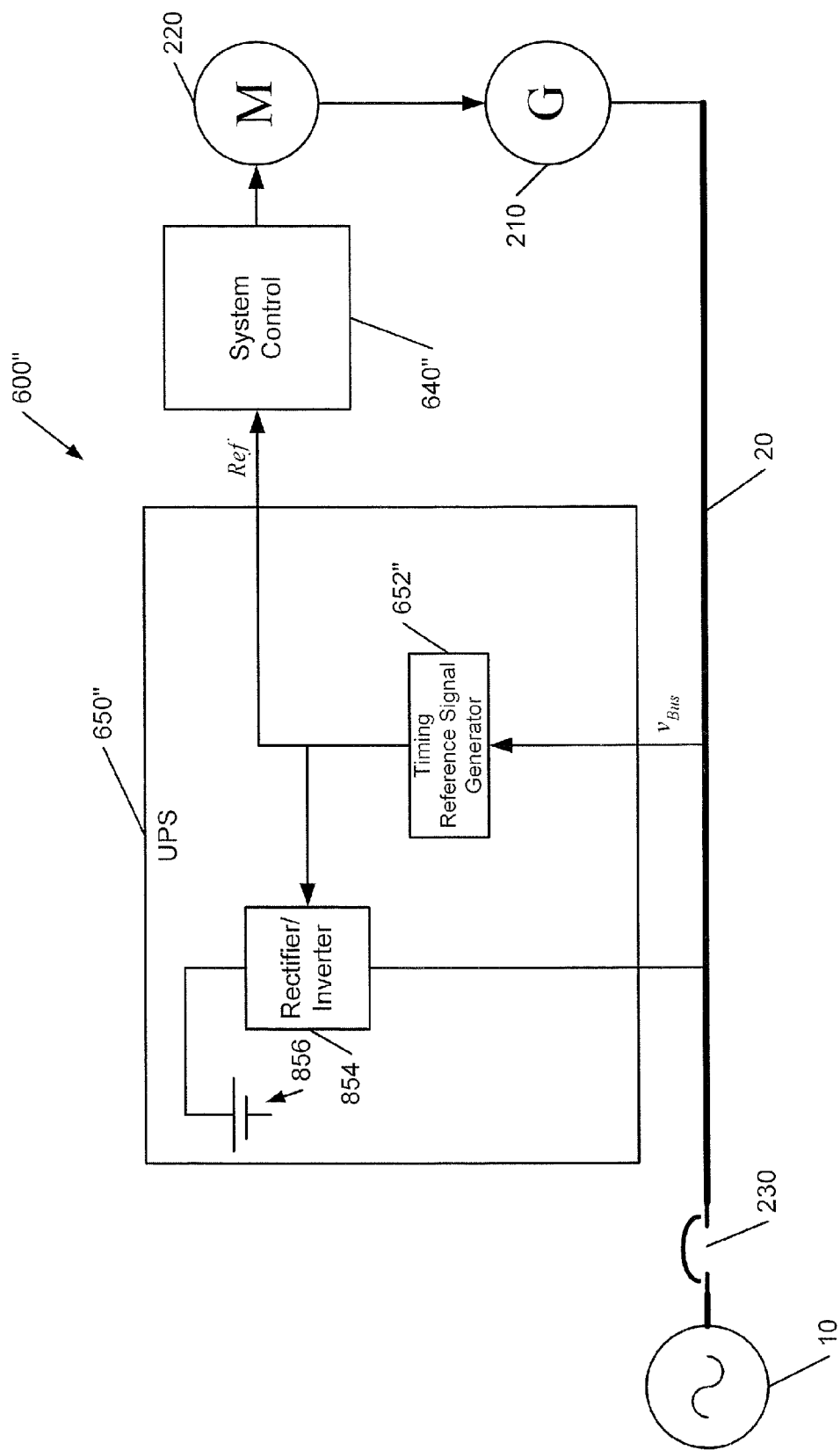

FIG. 8 illustrates another power generation system 600" according to further embodiments of the present invention. Like elements of the system 600" and the system 600 of FIG. 6 are indicated by like reference numerals, and will not be further described in light of the foregoing description thereof. The system 600" includes a line interactive UPS 650" that includes a rectifier/inverter 854 configured to be coupled to the bus 20 and to a battery 856 that provides an auxiliary power source that can be used to supply backup power to the bus 20 using the rectifier/inverter 854 as an inverter. The rectifier/inverter 854 operates responsive to a timing signal Ref generated by a timing signal generator circuit 652". The timing signal Ref is also provided to a system control circuit 640", which may operate along lines described above with reference to the system control circuit 640 of FIG. 6.

Figure 9:
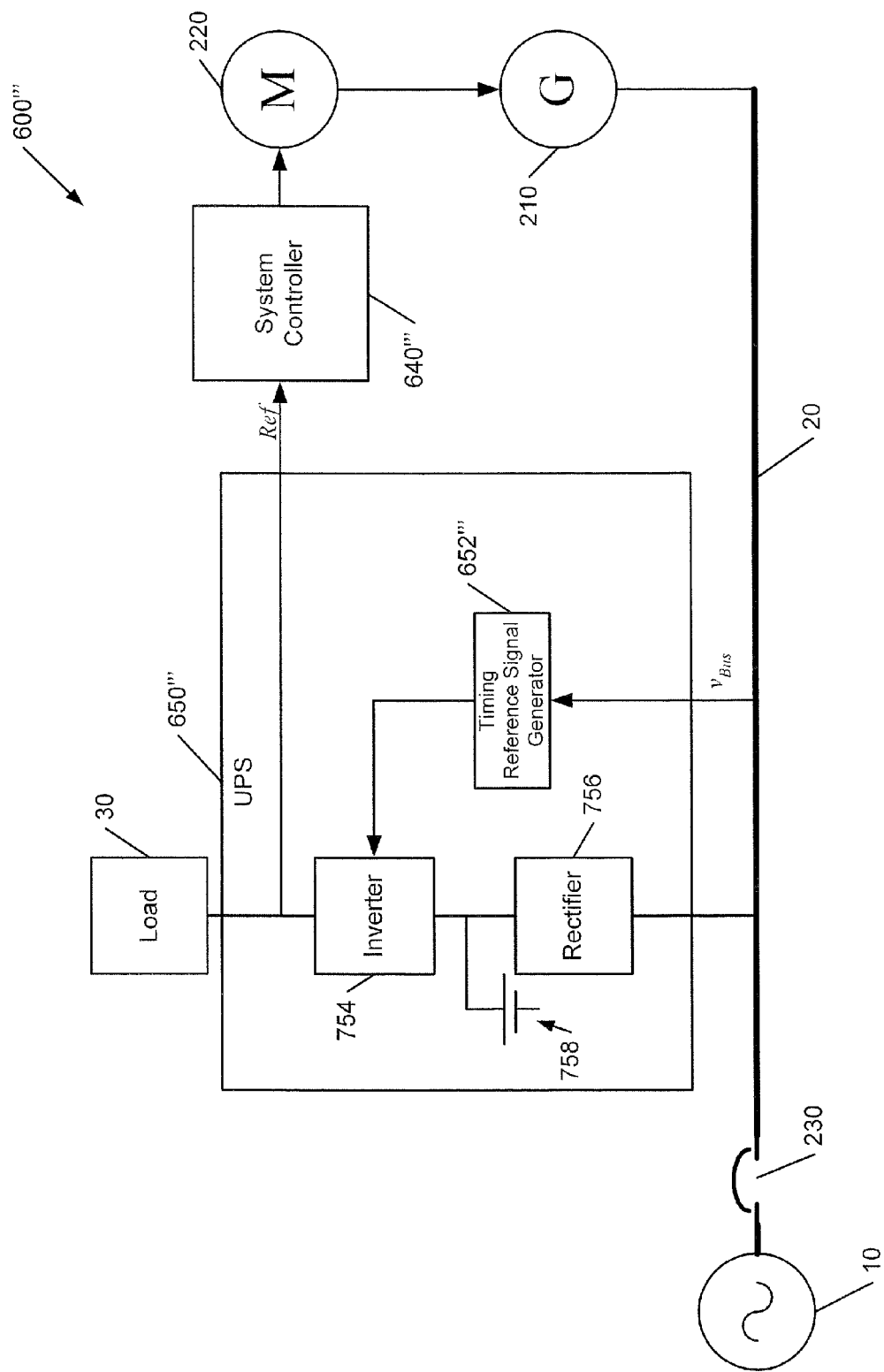

FIG. 9 illustrates a power generation system 600'" according to still further embodiments of the present invention. Like elements of the system 600'" and the system 600' of FIG. 7 are indicated by like reference numerals, and will not be further described in light of the foregoing description thereof. The system 600'" includes an online UPS 650'" that includes an inverter 754 that is configured to be coupled to a load 30 and that operates responsive to a timing signal generated by a timing signal generator circuit 652'". An output of the inverter 754 serves as a timing reference signal Ref that is provided to a generation system control circuit 640'", representing a modification of the scheme described above with reference to FIG. 7.

In the drawings and specification, there have been disclosed exemplary embodiments of the invention. Although specific terms are employed, they are used in a generic and descriptive sense only and not for purposes of limitation, the scope of the invention being defined by the following claims.

That which is claimed:

1. A power generation system comprising:
   a generator configured to be connected to a bus;
   a prime mover configured to drive the generator;
   a timing reference signal generator circuit configured to detect a timing variation of a voltage on the bus and, in response to detection of the timing variation, to generate a timing reference signal based on a prior timing of the voltage on the bus; and
   a generator control circuit configured to synchronize operation of the generator to the timing reference signal by operating the prime mover.

2. The system of claim 1, wherein the timing reference signal generator circuit is configured to generate a timing signal in synchronism with the voltage on the bus and to generate the timing reference signal based on prior behavior of the timing signal.

3. The system of claim 2, wherein the timing reference signal generator circuit comprises a phase locked loop configured to generate the timing signal.

4. The system of claim 1, wherein the timing variation comprises a variation of a cycle of the voltage on the bus.

5. The system of claim 1:
   wherein the timing reference signal generator circuit is configured to generate the timing reference signal in synchronism with the voltage on the bus prior to detection of the timing variation; and
   wherein the generator control circuit is configured to support a first mode wherein the generator control circuit controls power delivered to the bus in parallel while another power source to control a voltage waveform timing of the bus and a second mode wherein the generator control circuit synchronizes operation of the generator to the timing reference signal, and wherein the generator control circuit is further configured to transition from the first mode to the second mode responsive to the timing reference signal.

6. The system of claim 5, wherein the generator control circuit is configured to transition from the first mode to the second mode responsive to detection of a timing variation in the timing reference signal by the timing reference signal generator circuit.

7. The system of claim 1, wherein the timing reference signal generator circuit comprises an uninterruptible power supply (UPS) coupled to the bus.

8. The system of claim 7, wherein the UPS has an output configured to be coupled to a load, and wherein the timing reference signal comprises a voltage at the output of the UPS.

9. The system of claim 1, wherein the UPS comprises the timing reference signal generator circuit and an output inverter configured to generate a voltage at an output of the UPS responsive to the timing reference signal.

10. The system of claim 1, further comprising:
    a circuit interruption device configured to connect and disconnect the bus to and from a power source; and
    a control circuit configured to control the circuit interruption device responsive to detection of a timing variation of the voltage on the bus by the timing reference signal generator circuit.

11. A method of operating a power generation system comprising a generator configured to be connected to a bus and driven by a prime mover, the method comprising:
    detecting a timing variation of a voltage on the bus;
    responsive to detecting the timing variation, generating a timing reference signal based on a timing of the voltage on the bus prior to the timing variation; and then
    synchronizing operation of the generator to the timing reference signal by operating the prime mover.

12. The method of claim 11, wherein the timing variation comprises a variation of a cycle of the voltage on the bus.

13. The method of claim 11, wherein detecting a timing variation of the voltage on the bus is preceded by controlling power delivered to the bus by the generator while another power source controls a voltage waveform timing of the bus.

14. The method of claim 11, further comprising generating the timing reference signal at an uninterruptible power supply (UPS) coupled to the bus.

15. The method of claim 14, wherein the timing reference signal comprises an AC output of the UPS and/or a reference signal that controls an output inverter of the UPS.

* * * * *